Aug. 18, 1953  D. H. RANSOM  2,649,557
ELECTRIC POTENTIAL COMPARING CIRCUIT
Filed Jan. 28, 1950  2 Sheets-Sheet 1

INVENTOR
DAVID H. RANSOM
BY
AGENT

Aug. 18, 1953 D. H. RANSOM 2,649,557
ELECTRIC POTENTIAL COMPARING CIRCUIT
Filed Jan. 28, 1950 2 Sheets-Sheet 2
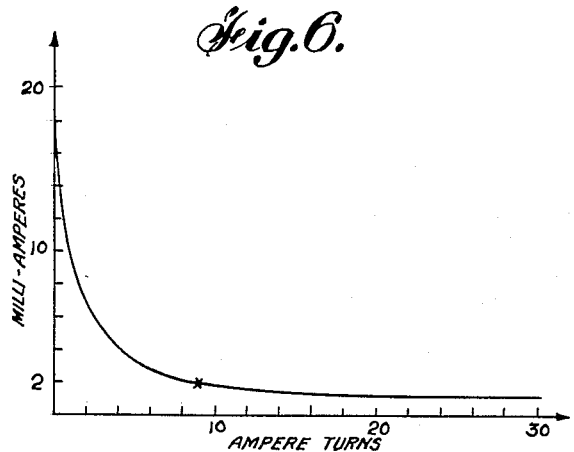
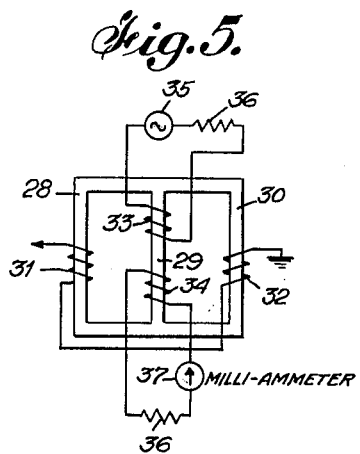
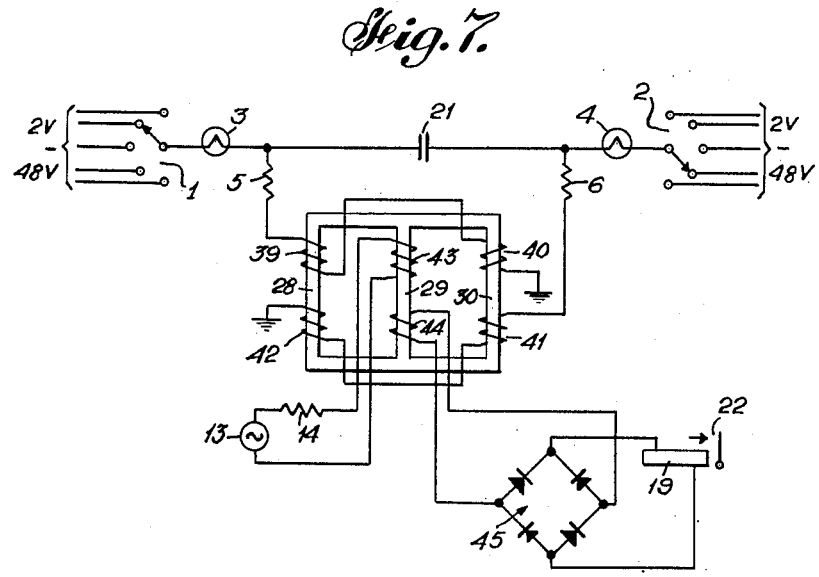
INVENTOR
DAVID H. RANSOM
BY
AGENT Patented Aug. 18, 1953

2,649,557

UNITED STATES PATENT OFFICE 2,649,557

ELECTRIC POTENTIAL COMPARING CIRCUIT

David H. Ransom, Pines Lake, South Paterson, N. J., assignor to International Standard Electric Corporation, New York, N. Y., a corporation of Delaware Application January 28, 1950, Serial No. 141,051

11 Claims. (Cl. 315—355)

1

This invention relates to electrical circuits for the comparison of direct current electrical conditions for the purpose of determining when a predetermined relationship exists between the values of two such conditions. Such arrangements are particularly, but not exclusively, applicable to the control of selection in automatic telephone and other switching systems such as is described, for example, in U. S. Patent 2,380,950, issued August 7, 1945, to Gerald Deakin.

In systems of the kind referred to a selector switch is caused to hunt, for example, under the control of a register in which a reference potential has been selected corresponding to the value of a digit received and when the selector switch reaches a position marked by a potential corresponding to or bearing a predetermined relationship to the reference potential selected in the register, the movement of the selector switch is arrested. In the past it has been the usual practice to apply the two potentials to electrodes of an electron discharge tube which when the potentials bear a predetermined relationship initiates the stopping of the selector switch.

According to the broadest aspect of the present invention, a saturable core reactor or non-linear coil is employed as the device for comparing a direct current reference potential with a second potential for causing the actuation of a detecting device when the two potentials bear a predetermined relationship to one another. In cases where, for example, the detecting device comprises an electronic discharge tube the present invention has the advantage that it enables the biasing potentials of the discharge tube to be chosen quite independently of the values of the potentials which it is required to detect. It also enables the detection of relatively small differences in potential in an extremely accurate manner since they do not have to be applied directly to a control electrode of the detector tube.

The invention will now be described with reference to several embodiments illustrated in the accompanying drawings in which:

Fig. 1 shows characteristic curves of saturable core reactors to illustrate the principle of the invention;

Figs. 2, 3 and 4, respectively, show three direct current potential comparing circuits according to my invention;

Fig. 5 shows a non-linear coil transformer arrangement;

Fig. 6 is a curve referred to in the explanation of Fig. 5, and

Fig. 7 illustrates a further form of comparison circuit based on the arrangement of Fig. 5.

2

Figure 1:
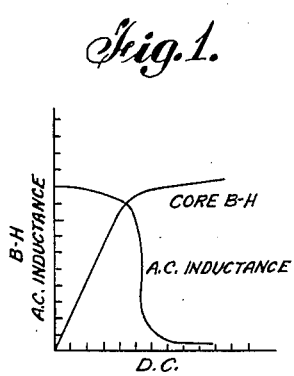

Referring to the curves shown in Fig. 1 when a direct current is caused to flow in a coil, the core of which is composed of one of the high permeability magnetic materials, the familiar B—H curve is developed and the amount of flux induced in the core increases until a certain critical value is reached, called the saturation point, after which a further increase of current produces no increase in the induced flux. If the A. C. inductance of a winding on this core is measured it will be found to follow an inverse curve, as shown in Fig. 1, wherein the A. C. inductance is relatively constant up to the D. C. saturation point after which it drops abruptly to a low value. If, therefore, such a coil is connected between, for example, a reference potential marked in a register switch and a potential engaged by a selector switch, the only time that A. C. current will pass through this coil is when the core is unsaturated and the difference between the respective potentials applied at the two ends does not exceed a predetermined value.

Figure 2:
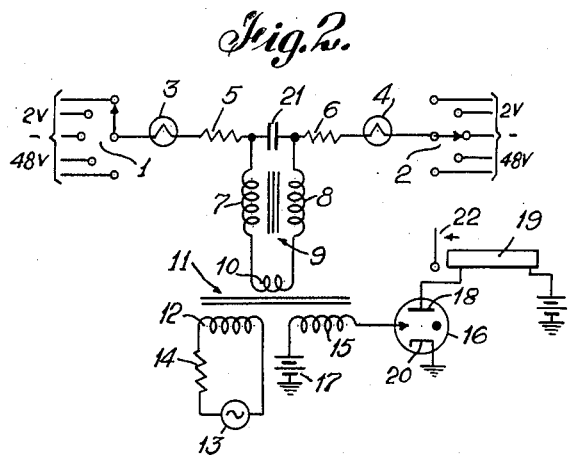

Referring to Fig. 2 of the drawings, 1 is a diagrammatic representation of a stepping switch located in a register and the contacts of which are connected to potentials arranged in two volt intervals, for example, from two volts to forty-eight volts. 2 is a selector switch the movement of which is required to be controlled and the contacts of which are also connected to potentials arranged in two volt intervals. The brushes of the switches 1 and 2 are, respectively, connected over non-linear limiting resistors 3, 4 and compensating resistances 5, 6 to the windings 7 and 8 of a linear coil 9, the other ends of these windings being connected to a winding 10 of a non-linear coil or saturable reactor 11. A second winding 12 of the saturable reactor 11 is connected to a source 13 of alternating current over a resistor 14 and a third winding 15 is connected to the control electrode of a gas discharge tube 16 and to a source of biasing potential 17. The anode 18 of the gas discharge tube 16 is connected to a winding of a relay 19 and the cathode 20 of tube 16 is connected to ground. A condenser 21 is connected between the junction points of the resistor 5 and winding 7 and the resistor 6 of the winding 8.

In operation a potential selected by the stepping switch 1 is applied over a non-linear resistor 3, compensating resistance 5, one winding 7 of the linear coil 9, winding 10 of the non-linear coil or saturable reactor 11, the second winding 8 of the linear coil 9 compensating resistance 6 and non-linear resistor 4 to the wiper of selector switch 2 which as it advances in known manner successively engages terminals connected to potentials in the same range as those connected to the contacts of the switch 1. The characteristics of the saturable reactor 11 compensating resistances 5, 6 and of the other elements of the circuit are so chosen that for every voltage engaged by the switch 2 except the particular voltage marked by the wiper of switch 1, the non-linear coil 11 is staturated and consequently the A. C. voltage of generator 13 is dissipated in the resistor 14. When, however, a predetermined voltage marked by the switch 1 is engaged by the wiper of switch 2, the non-linear coil is no longer saturated and the voltage of the generator 13 is induced in the second winding 15 and applied to the control electrode of the gas tube 16 which fires and causes the energization of relay 19. The closure of contacts 22 of relay 19 may be caused to arrest the movement of the selector switch 2 in any known manner or to perform any other desired signalling operation. Condenser 21 is provided to absorb transient voltages which might cause the incorrect firing of the gas tube 16 and false operation of the relay 19. The purpose of the linear coil 9 is to reduce the harmonics generated in the non-linear coil 11. If the characteristics of the elements of the circuit are properly chosen it may not in all cases be necessary to use a linear coil.

In an experimental circuit it was found that two volts was adequate to saturate the non-linear coil or saturable reactor 11. The values of the components were: Ballast resistors 3 and 4 were 24 volt GEC No. 2 switchboard lamps, 5 and 6 were 20 ohm resistors and the direct current resistance of the windings on the linear and non-linear coils 9 and 11 was approximately 20 ohms. With a difference of 48 volts across the terminals, the resistance of the switchboard lamps constituting ballast resistors 3 and 4 rose from 48 ohms to 250 ohms and satisfactorily limited the current in the bias winding 10 of the saturable reactor 11.

Figure 3:
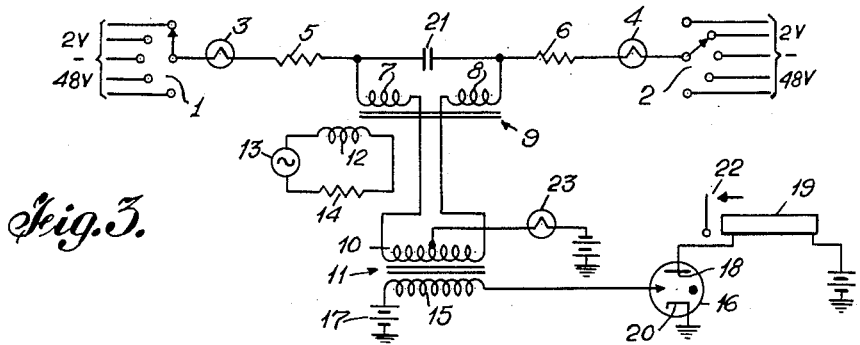

Fig. 3 shows a modified form of circuit in which the alternating current from the generator 13 is induced in the linear coil 9 and when the non-linear coil 11 is in the unsaturated condition alternating current is induced from winding 10 into winding 15 and the gas tube 16 is fired, as described with reference to Fig. 2. In the arrangement of Fig. 3 it is assumed that the switches 1 and 2 are of the type in which the wipers disengage one terminal before engaging the next. A 24 volt battery is connected over a limiting resistor 23 to the center point of winding 10 of the saturable reactor 11. When the wiper of switch 2 is between terminals current will then flow through one side of winding 10 and resistor 23 to the 24 volt source thus keeping the non-linear coil 11 saturated between terminals. A similar arrangement could, of course, be employed in connection with the modification of Fig. 2.

Figure 4:
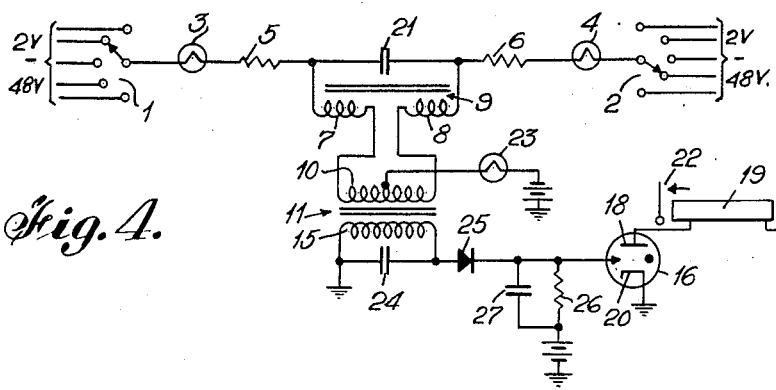

Fig. 4 illustrates still another modification in which the potential for operating the gas tube 16 is derived from a tuned secondary winding 15 on the non-linear coil 11. In this case the reactor 11 is saturated at all times except when equal potentials are engaged by the wipers of switches 1 and 2. At this time the secondary winding 15 will generate oscillations at a frequency determined by the inductance of the winding and the capacitance of a condenser 24 connected across it thereby developing over rectifier 25 a potential across resistor 26 and condenser 27 sufficient to fire the gas tube 16 and operate relay 19. Condenser 27 and resistor 26 may be used to provide a time delay in the operation of the gas tube 16 and consequently prevent false operation due to transient conditions.

Referring to Fig. 5, a closed transformer core with three limbs 28, 29, 30 is provided with a winding 31 on limb 28 consisting of 500 turns which is connected to a similar winding 32 on limb 30 in such manner that the fields of windings 31 and 32 with respect to two windings 33 and 34 on the middle limb 28 are series opposing and thus have no resultant inductance. If an alternating current source 35 is connected over a 600 ohm resistor 36 to the winding 33 and a milliammeter 37 is connected over a 600 ohm resistor 38 to the winding 34 the resultant output current read by the meter 37 as indicated on Fig. 6 plotted against ampere turns. It will be noted that an output current of 21 milliamperes is produced with no direct current in the windings 31 and 32. With a current of 9 ampere turns the resultant current indicated by meter 37 is reduced to 2 milliamperes. Further increase of ampere turns beyond this point results in little change in the output current.

Fig. 7 illustrates a further potential comparing circuit applying the principles illustrated by Fig. 5 and using a single saturable reactor which combines the functions of the linear and non-linear coils of the preceding arrangements. The wiper of switch 1 is connected over limiting resistor 3, compensating resistance 5, a winding 39 on reactor limb 28 and a winding 40 on reactor limb 30. Wiper of switch 2 is similarly connected over resistor 4 and resistance 6 to winding 41 and 42 on the limbs 30 and 28. The source of alternating current 13 is connected over resistor 14 to an upper winding 43 on the center limb 29 and a second winding 44 on this center limb is connected across diagonal points of a rectifier bridge 45, the other diagonal points of which are connected to the relay 19. The resistances 5 and 6 are so chosen that the lowest marking potential engaged by the switch 1 will saturate the core causing the current output of the rectifier bridge 45 to remain at a low value so that the relay 19 cannot operate. As the switch 2 engages various D. C. potentials these are applied through the windings 41 and 42 which are wound in such direction relative to windings 39 and 40 that when the switch 2 engages a potential equal to the potential marked by the switch 1, the non-linear coil will become unsaturated and alternating current from the winding 43 will be induced in winding 44 rectified by the rectifier bridge 45 and the relay 19 thereby operated.

It will be understood that my invention is not limited to the detailed circuits hereinbefore described and that other modifications will occur to those versed in the art coming within the spirit of the invention as set out in the accompanying claims.

What is claimed is:

1. A circuit arrangement for comparing direct current potentials comprising a first variable source of direct current reference potential, means for setting said first source at a certain value of potential, a second source of direct current potential to be compared with said first source, said sources having a common return connection, a saturable core reactor having a plurality of windings, means for influencing the core of said reactor by a direct current field derived from said first and second potential sources, an alternating current source, means for coupling said alternating current source to one of said windings and a detecting device connected to said last-mentioned winding.

2. A circuit arrangement for comparing direct current potentials comprising a first variable source of direct current reference potential, means for setting said first source at a certain value of potential, a second source of direct current potential to be compared with said reference potential, said sources having a common return connection, a saturable core reactor having first, second and third windings, electrical connections from said first and second potential sources to the respective ends of said first winding, a source of alternating current connected to said second winding and a detecting device connected to said third winding.

3. A circuit arrangement for comparing direct current potentials comprising a first variable source of direct current reference potential, means for setting said first source at a certain value of potential, a second source of direct current potential to be compared with said first source, said sources having a common return connection, a saturable core reactor having first and second windings, electric connections from said first and second potential sources to the respective ends of said first winding, a detecting device connected to said second winding, and a source of alternating current coupled to one of said windings.

4. A circuit arrangement for comparing direct current potentials comprising a first source of direct current reference potential, a second source of direct current potential to be compared with said first source, a saturable core reactor having first and second windings, electrical connections from said first and second potential sources to the respective ends of said first winding, a capacity connected across the ends of said second winding to form therewith an oscillatory circuit, an electrical connection to ground from one side of said second winding, a detecting device and an electrical connection including a rectifier from the other end of said second winding to said detecting device.

5. A circuit arrangement for comparing direct current potentials comprising a first source of direct current reference potential, a second source of direct current potential to be compared with said first source, a saturable core reactor provided with first, second, third and fourth windings, said first and second windings being so wound that their fields oppose one another, means for applying said first source of direct current potential across said first winding, means for applying said second source of direct current potential across said second winding, a source of alternating current connected to said third winding and a detecting device connected to said fourth winding.

6. A circuit arrangement according to claim 5, in which said reactor is provided with a closed core having three limbs, said first and second windings each comprising two parts wound respectively in series opposing relation on the two outer limbs, and said third and fourth windings being wound on the central limb.

7. A circuit arrangement according to claim 5, further comprising a bridge of rectifiers, said fourth winding being connected across one diagonal thereof and said detecting device being connected across the other diagonal thereof.

8. A circuit arrangement according to claim 5, further comprising a pair of non-linear limiting resistances connected respectively in the circuits including said first and second windings.

9. A circuit arrangement according to claim 2, further comprising a pair of non-linear limiting resistances connected respectively in the circuits extending from said first and second potential sources.

10. A circuit arrangement according to claim 3, further comprising a center tap on said first winding, a connection from said center tap to a source of potential and a non-linear limiting resistance in said connection.

11. A circuit arrangement according to claim 2, wherein said detecting device comprises a gas discharge tube having a load circuit connected in series with the anode cathode discharge path thereof.

DAVID H. RANSOM.

References Cited in the file of this patent

UNITED STATES PATENTS

| Number | Name | Date |
|---|---|---|
| 1,825,514 | Fitzgerald | Sept. 29, 1931 |
| 2,085,440 | Moser | June 29, 1937 |
| 2,139,232 | Hysko | Dec. 6, 1938 |
| 2,149,092 | Kettler | Feb. 28, 1939 |
| 2,227,468 | Sweeny | Jan. 7, 1941 |
| 2,338,423 | Geyger | Jan. 4, 1944 |
| 2,351,016 | Deakin | June 13, 1944 |
| 2,411,531 | Engelhardt | Nov. 26, 1946 |
| 2,454,781 | Deakin | Nov. 30, 1948 |
| 2,462,074 | Deakin | Feb. 22, 1949 |

FOREIGN PATENTS

| Number | Country | Date |
|---|---|---|
| 726,579 | France | Nov. 20, 1931 |